Figure 1:
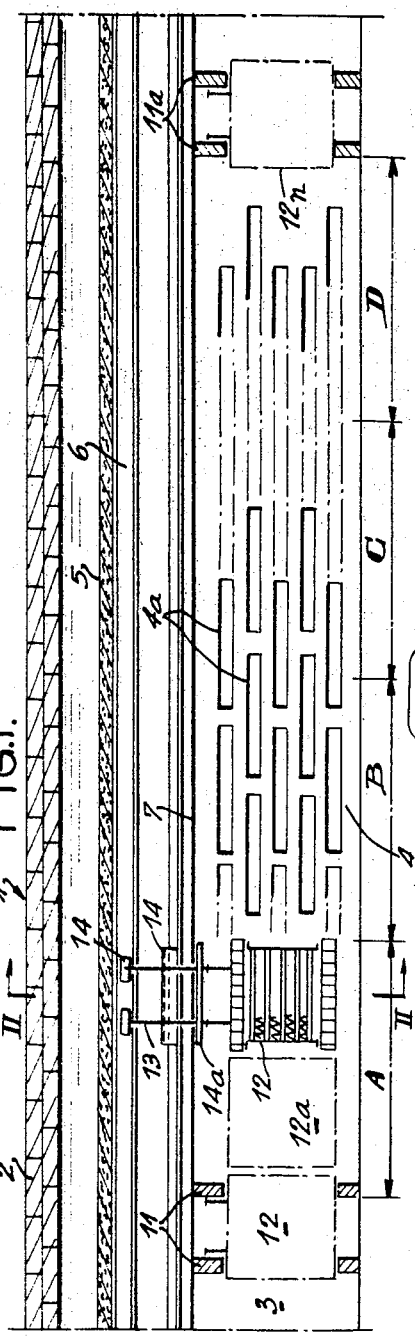

United States Patent
Chartet

[11] 3,769,675
[45] Nov. 6, 1973

[54] METHOD FOR BRAZING ALUMINUM RADIATORS

[75] Inventor: Andre Chartet, Meudon, France

[73] Assignee: Societe Anonyme des Usines Chausson, Asnieres, France

[22] Filed: Sept. 4, 1970

[21] Appl. No.: 69,593

[30] Foreign Application Priority Data
Sept. 22, 1969 France .............................. 6932199

[52] U.S. Cl. ............. 29/157.3 R, 29/202 R, 29/498, 29/DIG. 4, 228/20
[51] Int. Cl. .......................................... B21d 53/02
[58] Field of Search .......... 228/20; 29/498, 157.3 R, 29/202 R, DIG. 4

[56] References Cited
UNITED STATES PATENTS

| | | | |
|---|---|---|---|
| 2,298,996 | 10/1942 | Woods | 29/502 X |
| 3,318,503 | 5/1967 | Plegat | 29/157.3 R |
| 3,456,331 | 7/1969 | Holden | 29/498 X |
| 2,417,662 | 3/1947 | Rosales | 29/157.3 R |
| 3,386,152 | 6/1968 | Plegat | 29/157.3 B |
| 3,451,114 | 6/1969 | Werneke | 29/157.3 R |
| 3,515,330 | 6/1970 | Bronson et al | 228/20 X |
| 3,685,139 | 8/1972 | Early et al. | 29/498 |

Primary Examiner—Charles W. Lanham
Assistant Examiner—D. C. Reiley, III
Attorney—Imirie and Smiley

[57] ABSTRACT

The method for brazing aluminum radiators with brazing alloys comprises the steps of suspending said radiators and continuously displacing them through successive portions of a single lengthwise elongated furnace cavity with rear and front surfaces of said radiators directed at right angles with respect to successive streams of hot gas blown into each of said successive portions of said furnace at different temperatures and in adjacent relationship therebetween.

This disclosure relates to a novel method for brazing radiator cores all the parts thereof being made of aluminum or alluminum alloys and a part at least thereof being plated with a brazing alloy.

19 Claims, 11 Drawing Figures

PATENTED NOV 6 1973 3,769,675

SHEET 1 OF 4

INVENTOR
ANDRE CHARTET

*Imirie & Smiley*
Attys.

INVENTOR

ANDRE CHARTET

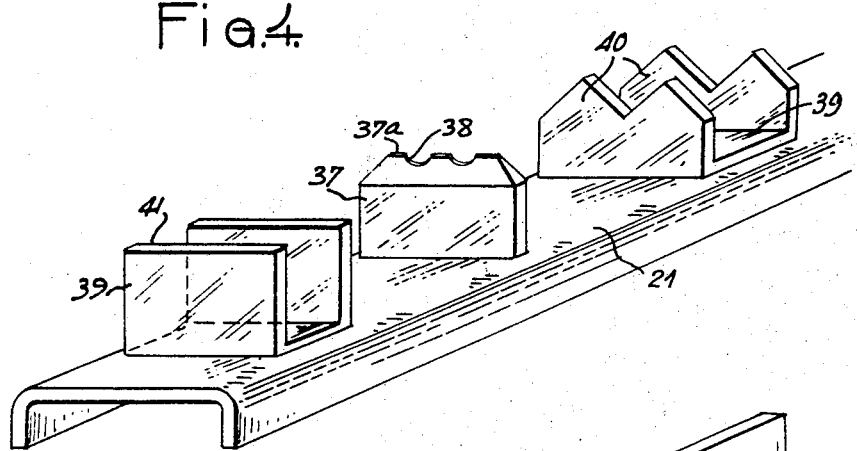
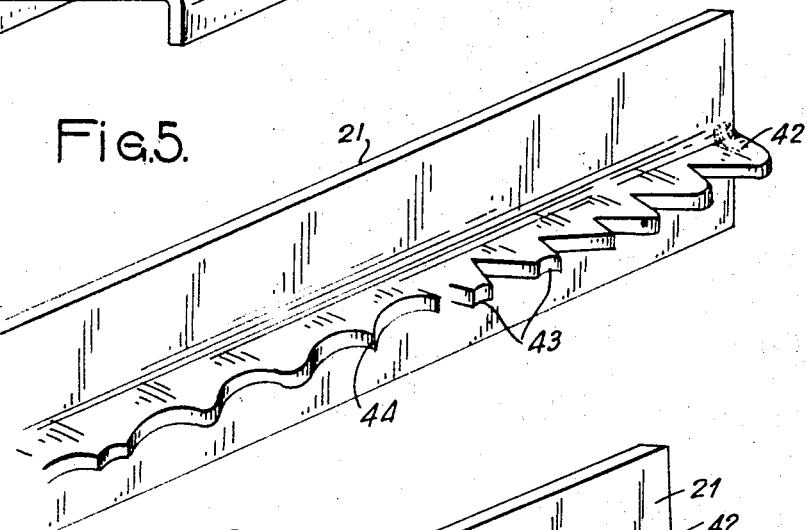
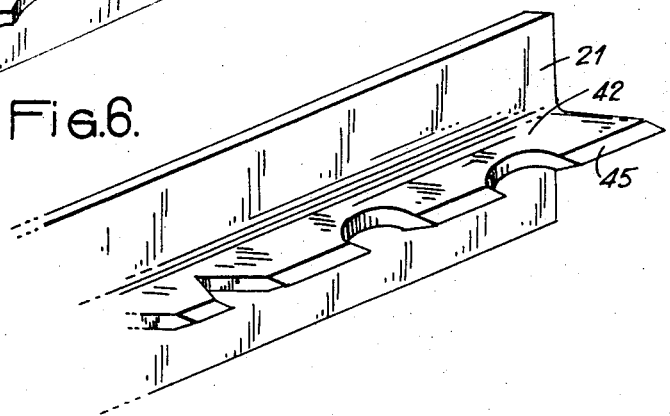

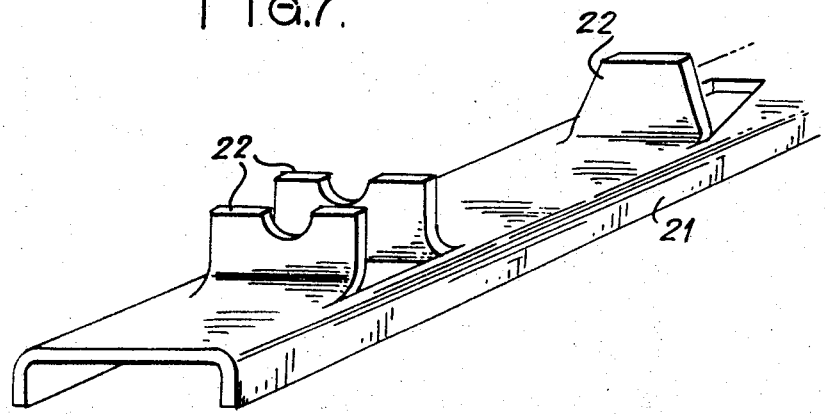
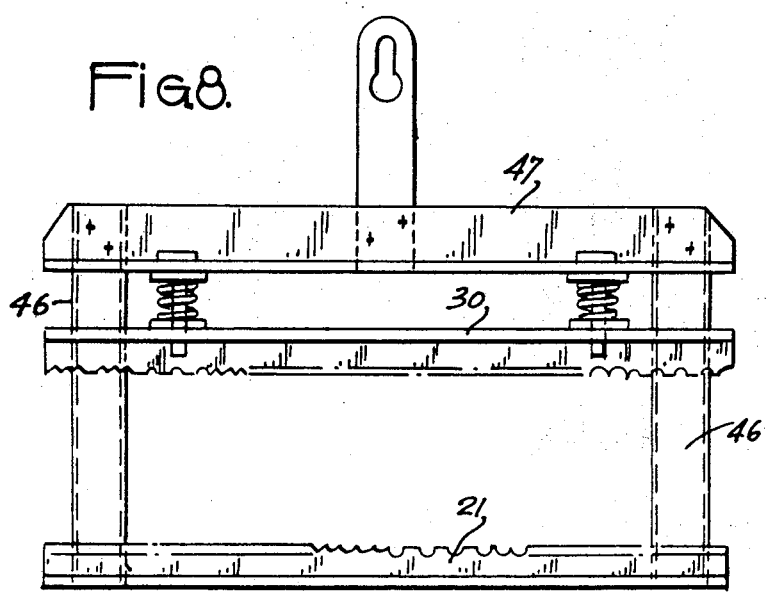
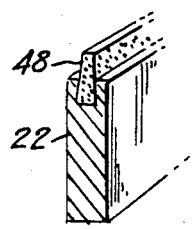 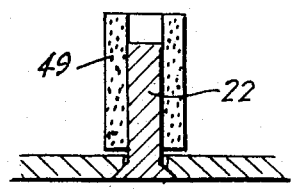

METHOD FOR BRAZING ALUMINUM RADIATORS

The invention relates to a non-stop brazing method, which means that the cores to be brazed are moved according to a strictly continuous motion or according to an intermittent but regular motion, and this with the use of hot gas blown on the cores instead of dipping the radiator cores into a melting salt bath.

Brazing by means of hot gas entails however some inconveniences which are well known. As a matter of fact, the hot gas to be used must never be at a temperature above the melting temperature of aluminum. Since the melting temperature of brazing alloys, particularly that of silicon-aluminum, is about the same as that of aluminum melting temperature (difference of about 30° to 40°C), and on account of this small difference between the respective melting temperatures of aluminum and of its brazing alloys, heating of the parts about end of the heating, tends to an asymptote so that the end of the heating step has to be long enough in order to reach regularly the brazing temperature.

It has been verified that keeping thin aluminum parts at a temperature close to brazing temperature is prejudicial to making good brazing due to the fact that the flux covering inevitably the parts to be brazed is quickly damaged at high temperatures and there is a great risk that aluminum will reoxidate as a result of high temperature of the gas and the presence of oxygen in the hot gas.

Because of the large number of soldering joints involved in the manufacture of a radiator, it is also essential that all the joints be perfectly made, which requires that all the radiator parts be located at a same temperature during all the brazing step.

An other serious inconvenience lies in the fact, that since brazing is carried out at a temperature close to the melting temperature of aluminum, the metal which is at a temperature close to said soldering temperature has only extremely low strength characteristics, while besides all the radiator parts must remain pressed one against each other. Therefore radiator manufacturers were heretofore faced to the following alternative: either to tight the parts and run the risk of their strain when the metal softens, or to leave the parts loose which will not however prevent their straining. Consequently, the parts are no longer in contact one against the other, and it results therefrom to make impossible a proper working out of the brazing joints.

This problem becomes more complicated also with the expansion to which the core parts are subjected when heated at brazing temperature. Said expansion is, in fact, important and tends to create an interval between the parts.

Another difficulty lies in the fact that the core, which must be tightened in a fitting support, is necessarily in contact with said support. The fitting support having to be rigid at brazing temperature is thus necessarily thick and the heating thereof is slow as compared with that of the core which results in the cooling of the core areas in contact with said support and a risk of bad soldering close to said areas. Moreover, there is a tendency for the flux covering said areas to flow out towards the warmer parts of the core, where it may overflow so that too much soldering alloy will pour into the aluminum which may perforate certain parts of the pieces. Moreover, the amount of flux may then be insufficient on certain areas of the parts.

The invention has been conceived and developed to provide means for brazing radiator cores with high efficiency and to ensure improved brazing of all the joints.

According to the invention, the radiator cores, after being covered with flux, are moved into successive areas of an enclosure, contiguous streams of hot gas are blown at right angle to the front surface of said radiators into each of said areas so as to create by themselves aerodynamic deflectors for the travelling of said streams, the velocity of a hot gas stream in one of the areas forming a pre-heating area is adjusted so as said velocity be just under the speed limit at which the flux would be blown and carried away, the velocity of the hot gas stream in the next area wherein the cores are heated at soldering temperature is adjusted to be at a higher velocity than that prevailing in the pre-heating area, and at least one other area is arranged wherein the cores are cooled down at a temperature about 300°C before to withdraw the cores from the enclosure.

Figure 3:
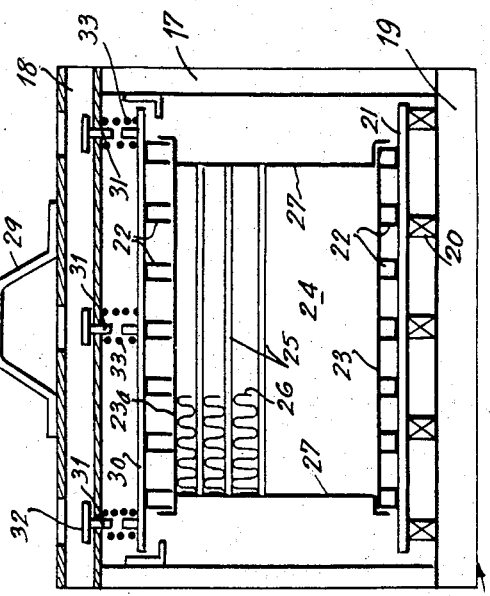
Figure 2:
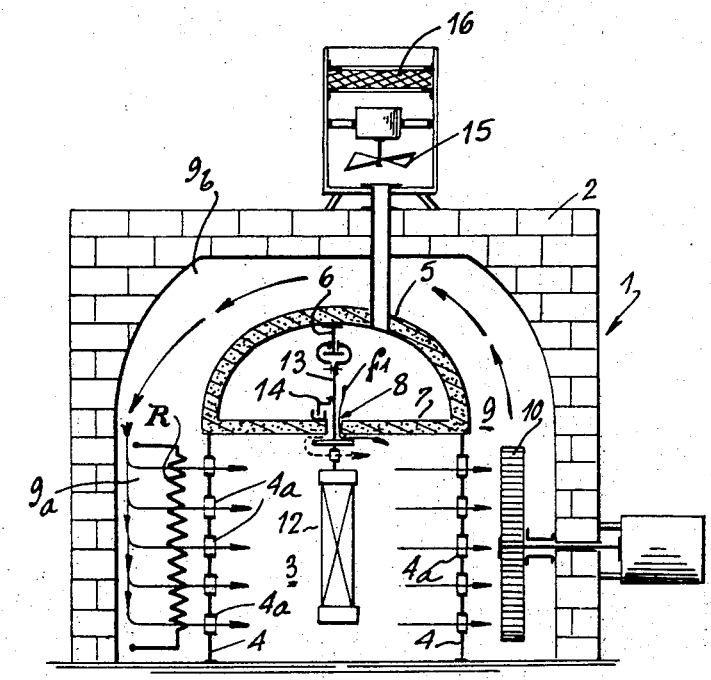
Figure 2A:
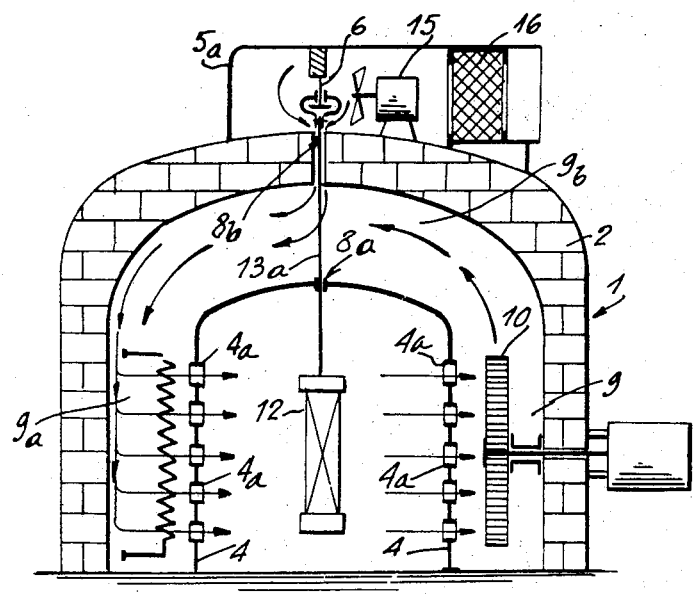

For a better understanding of the invention and to show how the same may be carried into effect, reference will now be made, by way of example, to the accompanying drawings, in which:

FIG. 1 is a diagrammatic sectional side view of a brazing furnace,

FIGS. 2 and 2a are cross sectional views taken substantially along the line II—II of FIG. 1, FIG. 3 is a diagrammatic side view, partly in section, of one form of one of the brazing cells travelling in the furnace shown in FIG. 1, FIG. 4 is an enlarged perspective view showing a specific feature of the brazing cells, FIGS. 5 and 6 are perspective views showing particular embodiment details, FIG. 7 is a view similar to FIG. 4 and showing another form of brazing cell, FIG. 8 shows a different form of the cell shown in FIG. 3, and FIGS. 9 and 10 are diagrammatic perspective views showing additional features of the furnace.

Referring to FIGS. 1 and 2, the brazing furnace includes a long arched structure 1 provided with heat insulating material 2. An enclosure 3 is defined within the structure 1 by partitions 4 which may be partly or entirely made of ceramic or stainless metal, for example stainless steel, so as to resist corrosive effects of vapour and/or projection of highly active flux products which are generally used for brazing of aluminum. As shown in FIG. 2, the partitions 4 support an insulated duct 5 which closes the top part of the enclosure 3, the duct having a conveyor 6 or transporter either in the form of a single rail or of an axially mobile unit of a type currently used in work-handling techniques. The duct 5, and particularly the lower wall 7 thereof forming the top part of the enclosure 3, is heat insulated, the wall 7 having a narrow longitudinal slot 8 therein.

The partitions 4 together with the structure 1 forms ducts 9 and 9a connected by a duct section 9b. The partitions 4 are perforated with apertures 4a which are spaced so as to provide an even flow for hot gas streams trasversely to the axis of the enclosure 3, the flow of gas being created by turbines or fans 10 set, for instance, in the duct 9. The heating of the air contained in the structure may be by various controlled means, e.g. by electric heating elements R set into the duct 9a or by town gas burners or fuel burners.

The positioning of the fans 10 and apertures 4a is such as to create inside the enclosure 3 successive areas wherein the hot gas travels at different temperatures and velocities in streams which are not separated from each other by the partitions projecting in the enclosure. In other words, the continguous hot gas streams are delimited by aerodynamic means exclusively.

Partitions 11 and 11a are however positioned at the inlet and outlet of the enclosure 3 in order to cut down the hot gas losses.

The furnace is intended to house cells 12, 12a,–12n which are all identical externally at least as regards the height and the width thereof. If the conveyor 6 is a fixd rail, then, as shown in FIG. 1, the cells 12, 12a and so on are in mutual contact and push one another whether or not they are loaded with a core or a radiator to be brazed. On the other hand, if the conveyor 6 is itself mobile, this arrangement, though advantageous, is no longer necessary.

In the embodiment shown in FIG. 2, the conveyor 6 is set in the duct 5, and the cells 12 are carried by suspension members 13 which are of small cross section and which run through the slot 8 of the lower wall 7. The suspension members 13 may be fitted with shutters and deflector units 14, 14a respectively set on either side of the wall 7 so as to limit the amount of gas escaping from the duct 5 and entering the enclosure 3. It has, in fact, been found advantageous to maintain the inside of the duct 5 under a slight over-pressure as compared with the enclosure 3 by blowing air into the duct 5 by a fan 15 fitted, if necessary, with a filtering, drying and preheating device 16. Thus, the inside of the duct 5, is thermally insulated from the enclosure 3 and ducts 9, 9a and 9b, is at a lower temperature than that of the latter and the air it contains is free of flux vapour, which makes it possible to use a simple conveyor that would be damaged if it were exposed to corrosive products or heat. The air entering the enclosure 3 is led in the direction of the arrow $f_1$ by the deflectors 14 and 14a so that the air stream travelling through the cell 12 is not cooled or disturbed.

A similar result is obtained by the form of furnace shown in FIG. 2a in which a duct 5a is provided on the top part of the furnace and houses both the conveyor 6 and the fan 15. In this case, the suspension members 13 which carry the cells are substantially longer and run both through the top part of the enclosure 3 and the furnace wall respectively through slots 8a and 8b. The shutters and deflectors 14, 14a of FIG. 2 may be omitted.

FIG. 3 shows a cell 12 which includes a rectangular frame 17 having stainless tubes 18 of square cross-section, preferably of stainless steel and the parts of the frame 17 may be connected together by welding, for example, provided that the welds be such that they will not corrode more than the constituent metal of the frame. Such welding may be carried out in some instances by resistance welding but most often it has to be made under a neutral or reducing atmosphere, or under vacuum, preferably by means of electron beams.

The width of the frame 17 and the height thereof correspond to the opening between the partitions 11 and 11a, so that when the cells 12 are pushed by each other, there will always be one frame between each pair of partitions which effectively seals the chambers formed thereby against loss of the furnace gases. When the cells 12 are not in contact with one another, the position of these chambers is so determined that there will always be a cell 12 in line with each of the chambers.

Should this arrangement not be feasible, means for temporaily closing the opening in these chambers formed by the partitions 11, 11a has to be fitted, this means being, opened upon entering and leaving of any cell.

By referring again to FIG. 3, it will be seen that a lower longitudinal girder 19 of the frame 17 supports by means of blocks 20 which are preferably flexible and made for instance of expanded metal or folded corrugated iron sheets, a supporting base plate 21. The base plate 21 carries projections 22 of a small cross-section, at least at the tips thereof, and which may, for instance, be made of pins relatively close to one another, the spacing between two projections ranging from about 15 to 20 mm.

The projections 22 are arranged to support at precisely determined points one of the flanges 23 of a radiator core 24, for example, which radiator includes pipes 25, heat dissipator parts 26 and tube plates 27.

As shown in FIGS. 2 and 2a, when the frame 17 of a cell is carried by the conveyor 6, the radiator core 24 is at right angles to the direction of flow of the hot gas. Thus, the hot gas travels through all the parts of the core evenly, the core acting as its own flow regulator.

In order to maintain the various parts of the core properly pressed against each other, a top plate 30 is fitted which is similar to the base plate 21 and bears, like the latter, projections 22 which rest on the second flange 23a. The projections can rest on other parts of the core, for instance, on fixing clips which are brazed on to the flanges.

The top plate 30 is vertically movable and is guided by means of rods 31 running through holes formed in the girder 18, or by means of clamps added to said girder, the rods 31 preferably being formed with a head 32 in order to limit the travel of the top plate 30.

In general, the weight of the top plate 30 is sufficient for maintaining the various parts of the radiator properly in contact, namely the flanges, the pipes and the heat dissipators in order that the pressure of these parts, i.e. the respective positions thereof and the pressure they exert against one another, should be satisfactory at the time the brazing is made. However, calibrated springs 33 may also be set between the top plate and the girder 18 if for instance where the weight of the top plate 30 is not sufficient for maintaining the required pressure between the various parts of the radiator, particularly for a large-size radiator, since it is important that the base plate 21 and the top plate 30 with their projections 22 should be light in order to exhibit a low thermal inertia so as to reduce as much as possible heat conduction between the core 24 and the parts on which its rests.

Since the top plate 30 is pressed either by its own weight on to the core to be brazed, or by means of calibrated springs and since the block 20 which holds the base plate 21 preferably shows a certain elasticity, the differential expansions between aluminium (the basic constituent metal of the radiator) and the stainless steel (the basic constituent metal of the various parts of the cell) are compensated, the lengthwise differential expansion being, if necessary, compensated by a slight relative sliding movement between the cell parts and the core.

Since it often happens that different types of radiator core have to be brazed in the same furnace without modifying the cells, projections 22 are arranged so as not to be all used for holding a given type of core during brazing thereof.

Since the base plate 21 is normally fixed and the top plate 30 and the springs 33 are guided into the cell 12, means for spacing the plate 30 and springs 33 from the base plate 21 may easily be designed so as to facilitate the loading and unloading of the cells.

The projections 22 need not necessarily be pin shaped and FIG. 4 shows that the projections, which are shown on the base plate 21, may be formed of cross-bars 37, the part 37a thereof, which contacts the core to be soldered, being wedged and advantageously having notches 38 intended to lessen the contact surface. The projections may also be formed of U shaped parts 39 with triangular apices 40 or even flat edges 41, the shape of the cross-bars 37 or of the U shaped parts depending chiefly on the core parts which have to be held and on whether the core parts are fragile or whether accessories have to be held against the flanges 23 or other parts thereof.

The base plate 21 as well as the top plate 30 may also be T shaped as shown in FIGS. 5 and 6 and, in this case, the web 42 of the structure is cut out so as to provide supports 43 and 44 having different forms, depending on the core parts over which the supports 43 and 44 exert a pressure. FIG. 6 shows the web 42 thinned down at the tip thereof to form a wedge 45 in order to lessen the contact surface.

FIG. 7 shows another form of base plate 21 and top plate 30. In this case, a U shaped base plate is used and projections 22 are formed by punching and bending which provides small contact surfaces with the radiator core though these surfaces may be close to one another.

This arrangement has another advantage. By punching and bending the projections 22 from a U shaped base plate it becomes possible to give them a certain shape so that the projections 22 assist in directing the hot gas on to certain parts to be brazed, and assisting in eliminating disturbances in the flow of the hot gas.

When T or U sections are used for making the base plate 21 and top plate 30, the cell may itself be simplified because these shapes have a great rigidity owing to their form. In this case, as shown in FIG. 8, the base plate 21 constitutes the lower girder of the cell and is connected by struts 46 to another T or U section 47 which constitutes the upper girder of the cell from which is suspended the top plate 30, the suspension being as described with reference to FIG. 3.

It has been found desirable not only to limit the heat conductivity between the core to be brazed and the cell holding it, but also to reduce or even eliminate the risk of adherence between the core, once brazed, and the projections of the cell. This may be achieved as shown in FIGS. 9 and 10 by providing the projections 22 (or 37, 39 of FIG. 4) with tips 48 or sleeves 49 made of a non-corrodible refractory material which does not draw the soldering; suitable materials are, for instance, ceramic or steatite.

As appears from the foregoing, the supporting cells of the cores or radiators to be brazed on the one hand, must have a low heat inertia in the parts thereof which are close to the core and, on the other hand, include means which prevent almost entirely any heat transmission between them and the core and, further, allow hot gas to travel under the best aerodynamic conditions into all the core parts, thereby making it possible that all the core parts be heated at a homogeneous temperature.

Constructing the cells from a metal resistant to the corrosive action of soldering flux enables the cells to be used for holding in position the constitutent parts of the core during the course of fluxing, whether this is carried out by means of bath or by spraying.

If the fluxing of the cores to be brazed is carried out in a bath, the furnace, as shown in FIG. 1, has four compartments A to D. On the contrary, if the core is fluxed by spraying, the area A may be omitted since this area may be separated from the next area which is chiefly used as a drying oven and the temperature thereof is about 150°C. It is however possible, even when fluxing by spraying, to retain the area or compartment A in the furnace but the furnace must then be so designed that the spray fluxing is carried out in the compartment A, where the cores are pre-heated and where the prevailing temperature is close to the flux fluidization temperature.

The lengths of the various areas of the furnace depend upon both the velocity of the cells and the time required in each area for heating the cores to the desired temperature.

The compartment A, may serve either as a drying oven or as a flux spraying compartment and when the compartment serves as a drying oven, it has been found advantageous that the cores stay in the compartment for 10 to 60 minutes at a temperature of about 150°C so that they are dried entirely.

Area B is a pre-heating area and the cores to be brazed remain there for 10 to 20 minutes. The temperature to which the cores are heated in this area depends directly on the nature of the brazing alloy. If the brazing alloy is a silicon-aluminum alloy having 7.5 percent silicon the temperature in area B is 570° ± 5°C; when the aluminum-silicon brazing alloy has 12 percent silicon, tthe temperature may be only 550° ± 5°C.

Area C is the brazing area and in this area the temperature is 615° ± 2°C in the case of a brazing alloy having 7.5 percent silicon but only 600° ± 2°C in the case of an alloy having 12 percent silicon.

Area D is used for pre-cooling and the temperature of the cores is lowered therein to approximately 300°C so as to prevent the cores from being subjected to thermal shocks which are prejudicial to a good formation of the brazings.

As already indicated above, it is also important that the flow velocities of the hot gas in the various areas be properly regulated. It has been noted that the flux deposited on the parts to be brazed has actually a tendency to be blown and carried away when the velocity of the hot gas is too high. Generally, a velocity of about 4 m/s is suitable for most of the areas. It is also important that the brazing temperature, i.e., the temperature in the area C, be reached quickly. It has been surprisingly found that after the pre-heating in area B wherein the melting temperature of the brazing alloy is not reached, but wherein however the flux itself is molten, excess flux is blown away, leaving some flux by capillary action held in the joints, i.e. just where required for the best brazing and it becomes possible substantially to increase the flow velocity of the hot gas.

As mentioned, the velocity in area B should be limited to approximately 4 m/s, but may reach 6 m/s in area C, which reduces the time of the core staying in these areas, the time for example being between 10 and 20 minutes for area B and 3 to 5 minutes for area C, so that, during these short spaces of time, the risk of aluminum reoxidation is eliminated, especially as a thin film of molten flux remains on all the surfaces of parts to be brazed thus preventing any oxidation.

The invention is not restricted to the examples shown and described in detail, since various changes may be made which are contemplated or may come within the scope of the claims. In particular the connection between ducts 9 and 9a may be made for instance, by setting duct 9b or pipes, either under the furnace or laterally thereto.

I claim:

1. A method for brazing aluminum radiators with brazing alloys comprising the steps of continuously displacing aluminum radiators into and longitudinally through a single elongated furnace cavity so that rear and front surfaces of said radiators are maintained parallel to a plane passing along the longitudinal axis of said cavity, blowing in a plurality of adjacent stream of hot gas at right angles with respect to said plane in said cavity, maintaining each of said streams of hot gas respectively at different and substantially constant temperatures corresponding to a brazing cycle suitable for said brazing alloys whereby said streams of hot gas at different temperatures are not materially separated and said radiators pass through the brazing cycle thereof as they are displaced longitudinally through said furnace cavity.

2. A method as claimed in claim 1, comprising the further step of adjusting the velocity of the stream of hot gas which is blown in a pre-heating zone of the furnace to be only slightly less than that velocity at which a flux coating on said radiators, which is melted by said hot gas, would be blown away and adjusting the velocity of the stream of hot gas blown in a brazing zone of said furnace adjacent the pre-heating zone, and in which said streams of hot gas heats said radiators to brazing temperature, to be substantially greater than the velocity of the stream of hot gas in the pre-heating zone.

3. A method as claimed in claim 1 comprising the further step of providing the stream of hot gas which is blown in a pre-cooling zone of said furnace adjacent a brazing zone of the furnace which is at a temperature less than the temperature of the stream of hot gas blown in said brazing zone, whereby the radiators are pre-cooled while travelling through said pre-cooling zone.

4. A method as claimed in claim 2 wherein the radiators remain from 10 to 20 minutes in the preheating zone.

5. A method as claimed in claim 2 wherein the radiators remain from 3 to 5 minutes in the brazing zone.

6. A method as claimed in claim 3 wherein the radiators remain from 3 to 5 minutes in the brazing zone.

7. A method as claimed in claim 2 wherein the brazing alloys are silicon-aluminum alloys having 7.5 percent silicon and the temperature of the stream of hot gas blown in the pre-heating zone is 570° ± 5°C 8. A method as claimed in claim 2 wherein the brazing alloys are silicon-aluminum alloys having 12 percent silicon and the temperature of the stream of hot gas blown in the pre-heating zone is 550° ± 5°C 9. A method as claimed in claim 2 wherein the brazing alloys are silicon-aluminum alloys having 7.5 percent silicon and the temperature of the stream of hot gas blown in the brazing zone is 615° ± 2°C 10. A method as claimed in claim 3 wherein the brazing alloys are silicon-aluminum alloys having 7.5 percent silicon and the temperature of the stream of hot gas blown in the brazing zone is 615° ± 2°C.

11. A method as claimed in claim 2 wherein the brazing alloys are silicon-aluminum alloys having 12 percent silicon and the temperature of the stream of hot gas blown in the brazing zone is 600° ± 2°C 12. A method as claimed in claim 3 wherein the brazing alloys are silicon-aluminum alloys having 12 percent silicon and the temperature of the stream of hot gas blown in the brazing zone is 600° ± 2°C 13. A method as claimed in claim 3 wherein the temperature of the stream of hot gas blown in the pre-cooling zone is substantially equal to 300°C 14. A method as claimed in claim 1 wherein the streams of hot gas are blown at a velocity of substantially 4 to 6 meters per second.

15. A method for brazing aluminum radiators with brazing alloys comprising the steps of continuously displacing said radiators into and longitudinally through an enclosure, said enclosure being defined by longitudinal walls having apertures for continuous communication of said enclosure with channels surrounding said walls and in which are located sets of heating means aand blowers for heating and circulating gas respectively in said enclosure and directing transversely successive streams of hot gas at different temperatures through said enclosure and into contact with said radiators, said streams themselves delimiting successive adjacent zones in said enclosure which correspond at least to preheating, brazing, and pre-cooling portions of a brazing cycle.

16. A method as claimed in claim 15 comprising the further step of providing cells which surround said radiators and which move within said enclosure while maintaining said radiators normal to said streams of hot gas and forming successively closure members for said enclosure at inlet and outlet ends.

17. A method as claimed in claim 15, wherein said blowers each circulate gas heated by said heating means at different velocities to form streams of hot gas at different velocities and temperatures.

18. A method as claimed in claim 17 comprising the further step of including in said brazing cycle a drying portion having a drying stream of gas and being located before said pre-heating zone relative to direction of movement of said radiators through the enclosure.

19. A method as claimed in claim 17 comprising the further step of including in said brazing cycle a fluxing zone provided before said pre-heating zone relative to direction of movement of said radiators through the enclosure and in which said flux is sprayed upon said radiators.

* * * * *